United States Patent [19]

Kunz et al.

[11] Patent Number: 5,009,675

[45] Date of Patent: Apr. 23, 1991

[54] COATED SILICON CARBIDE ABRASIVE GRAIN

[75] Inventors: Reiner Kunz, Waldshut-Tiengen, Fed. Rep. of Germany; Rainer Dietrich, Basel, Switzerland

[73] Assignee: Lonza LTD, Switzerland

[21] Appl. No.: 363,059

[22] Filed: Jun. 8, 1989

[30] Foreign Application Priority Data

Jun. 17, 1988 [CH] Switzerland ............... 2356/88

[51] Int. Cl.$^5$ .................................. B24B 1/00
[52] U.S. Cl. .................................. 51/295; 51/293; 51/308; 51/309
[58] Field of Search ............... 51/293, 295, 308, 309

[56] References Cited

U.S. PATENT DOCUMENTS

| | | | |
|---|---|---|---|
| 1,910,445 | 5/1933 | Nicholson | 51/308 |
| 2,527,044 | 10/1950 | Walton et al. | 51/309 |
| 3,520,667 | 7/1970 | Taylor | 51/308 |
| 4,249,913 | 2/1981 | Johnson et al. | 51/295 |
| 4,426,209 | 1/1984 | Sarin | 51/295 |
| 4,505,720 | 3/1985 | Gabor et al. | 51/295 |
| 4,514,192 | 4/1985 | Verma et al. | 51/308 |
| 4,575,384 | 3/1986 | Licht et al. | 51/308 |

*Primary Examiner*—William R. Dixon, Jr.
*Assistant Examiner*—Willie Thompson

[57] ABSTRACT

An abrasive grain on the basis of silicon carbide with a binder-free coating of highly dispersed silicon, aluminum or titanium oxide for preferred use in resin-bonded or ceramic-bonded abrasive wheels.

16 Claims, No Drawings

COATED SILICON CARBIDE ABRASIVE GRAIN

BACKGROUND OF THE INVENTION

1. Field Of The Invention

The invention relates to a surface-treated abrasive grain on the basis of silicon carbide and its use in resin-bonded or ceramic-bonded grinding wheels.

2. Background Art

Silicon carbide is one of the most important abrasives and is used especially for grinding and cutting off hard and brittle materials. It is used both for loose abrasives and for abrasives on a support and abrasive wheels such as grinding and cutting-off wheels. The grinding performance and especially the wear ratio or service life of the abrasive wheels, thus, depends not only on the properties of the abrasive grain itself but also to a considerable extent on the type and strength of the binding of the abrasive grain in the binder. Especially with resin-bonded abrasives, the adhesion of the silicon carbide grain in the binder generally is the factor determining performance and wear. Therefore, numerous attempts have been made to improve the binding by a suitable treatment of the very smooth surface of the silicon carbide.

A frequently used method is the production of a ceramic coating which coats the grain like a glaze. U.S. Pat. No. 1,910,444, for example, describes such a process. If a slightly meltable material in a particle size that is considerably less than the abrasive grain is added to the coating, a roughened coating is obtained, as described, for example, in U.S. Pat. No. 2,527,044.

But considerable drawbacks are inherent in all of such processes. They require several process steps, including a firing or sintering process and, therefore, are time- and energy-consuming. In addition, agglomerates are formed by caking of the individual grains. Such agglomerates must be removed by an additional screening process or must be mechanically destroyed, and the just applied coating is again partially lost. Below a certain grain size the agglomerate formation is so predominant that the process can no longer be used.

In ceramic-bonded abrasive wheels the use of ceramically coated abrasive grains is generally not advisable, since during firing of the abrasive wheels at about 1150° to 1400° C. the binder of the coating again melts and, together with the applied fine grain (e.g., $Fe_2O_3$), penetrates into the ceramic mass and can initiate disturbing reactions there which, for example lead to pore formation or color deviation. Further, when the abrasive wheels are used, especially in dry grinding, the binder can soften by the development of heat and cause the grain to break off.

BROAD DESCRIPTION OF THE INVENTION

The object of the invention is to provide surface treatment of abrasive grains on the basis of silicon carbide, which improves the binding of the resin-bonded or ceramic-bonded abrasives, without exhibiting the described drawbacks.

It was surprisingly found that the object according to the invention can be acheived by coating the abrasive grain with a highly dispersed hydrophilic metal oxide without additional binder. The silicon carbide abrasive grain can, with its grain size, be both in the macrorange and microrange according to FEPA standard. Silicon dioxide, such as, Aerosil ®, aluminum oxide or titanium dioxide, individually or as mixtures in each case, can be used as highly dispersed hydrophilic metal oxide. The highly dispersed hydrophilic metal oxide is suitably applied in an amount of 0.01 to 5 percent, preferably from 0.1 to 1.0 percent, relative to the weight of the abrasive grain. The primary particle size ($d_{50}$ value) of the highly dispersed hydrophilic metal oxide preferably is between 1 and 500 nm, especially preferably between 5 and 50 nm, and the specific surface (according to BET) is preferably between 5 and 500 $m^2/g$, especially preferably between 50 and 400 $m^2/g$.

The application of the highly dispersed hydrophilic metal oxide to the abrasive grain takes place preferably by mixing the abrasive grain with the highly dispersed hydrophilic metal oxide in the dry state or with a suspension of the highly dispersed hydrophilic metal oxide in a vaporizable liquid and subsequent drying. Preferably water is used as the vaporizable liquid but other polar or nonpolar liquids are also suitable, such as, lower alcohols, ketones, esters, ethers or hydrocarbons or mixtures of said liquids. The mixing especially preferably takes place in the dry state. Tumbling mixers are especially suitable as mixers, such as rotating drum mixers or double-cone mixers, or mixers with rotating mixing tools such as blade mixers or paddle mixers.

A preferred use of the abrasive grain according to the invention is the production of resin-bonded or ceramic-bonded abrasive wheels, such as, grinding or cutting-off wheels.

Of course, it is within the scope of the invention to use the abrasive grain according to the invention in combination with other abrasive grains for the production of abrasive wheels, especially with diamond abrasive grains or abrasive grains from cubic boron nitride. Here the silicon carbide abrasive grain according to the invention can be used both as support grain in the abrasive area of the abrasive wheel and for reinforcement and better heat dissipation in support foundations.

DETAILED DESCRIPTION OF THE INVENTION

The following examples illustrate embodiments of the invention and the properties of the abrasive grain according to the invention.

EXAMPLE 1

An amount of silicon carbide (Carbogran ® dark F 24, LONZA-Werke GmbH, Waldshut) was divided into halves. One half was treated according to the invention of 0.5 percent by weight of hydrophilic $Al_2O_3$ [primary particle size $d_{50}=20$ nm, specific surface $(BET)=100\pm15$ $m^2/g$] by dry mixing in a tumbler mixer. Cutting-off wheels were produced with these grain patterns under constant conditions as follows:

The initial materials [73 percent by weight of grain, 13 percent by weight of filler (cryolite), 14 percent by weight of phenolic resin powder and phenolic resin liquid], with the addition of the liquid phenolic resin portion, was worked into a homogeneous free-flowing compound and then was molded in a press mold between two outside fabrics at a pressure of 200 $kg/cm^2$. Hardening of the wheels took place as usual in an oven at 190° C.

The abrasive performance was determined with a commercial cutting-off machine on vibration-compacted concrete bars with a cross section of 80×60 mm. For this purpose, 5 separating cuts per wheel were made, and as a measurement for the performance of the wheel, the accompanying reduction of the wheel diameter (in mm) was determined. Table 1 shows the results.

TABLE 1

| Wheel dimensions: | 230 × 2.5 × 22 mm | |
|---|---|---|
| Concrete bars: | 80 × 60 mm | |
| 5 separating cuts | | |
| | Carbogran ® F 24 | |
| | Treated | Untreated |
| Average of breaking speed (m/s) | 160 | 165 |
| Average of wheel density (g/cm³) | 2.07 | 2.01 |
| Diameter reduction (mm) | 11 | 14 |
| | 10 | 13 |
| | 13 | 17 |
| Average of diameter reduction (mm) | 11.3 | 14.7 |
| Relative performance factor | 123% | 100% |

EXAMPLE 2

Cutting-off wheels were produced and tested similarly to Example 1. The composition of the wheels: 78 percent by weight of abrasive grain, 8 percent by weight of filler (cryolite), and 14 percent by weight of phenolic resin powder and phenolic resin liquid. Table 2 shows the results.

TABLE 2

| Wheel dimensions: | 230 × 3 × 22 mm | |
|---|---|---|
| Concrete bars: | 80 × 60 mm | |
| 5 separating cuts | | |
| | Carbogran ® F 24 | |
| | Treated | Untreated |
| Average of wheel density (g/cm³) | 2.10 | 2.13 |
| Diameter reduction (mm) | 20 | 26 |
| | 19 | 24 |
| | 21 | 25 |
| Average value (mm) | 20 | 25 |
| Relative performance factor | 120% | 100% |

EXAMPLE 3

A production charge of silicon carbide (Carbogran ®, Gotthardwerke Bodio; granulation 0.4 to 1 mm) was divided into four parts. One part of the mixture was not treated, so as it was standard grain. One of each of the remaining three parts was surface coated according to the invention with:

(a) 0.5 percent by weight of hydrophilic $Al_2O_3$ [$d_{50}$=20 nm, specific surface (BET)=100±15 m²/g]

(b) 0.5 percent by weight of hydrophilic $TiO_2$ [$d_{50}$=21 nm, specific surface (BET)=50±15 m²/g]

(c) 0.5 percent by weight of hydrophilic $SiO_2$ [$d_{50}$=7 nm, specific surface (BET)=380±30 m²/g] by mixing in a tumbler mixer. The further procedure took place similarly to Example 1. Table 3 shows the results by average values.

TABLE 3

| Wheel dimensions: | 230 × 2.5 × 22 mm | | | |
|---|---|---|---|---|
| Concrete bars: | 80 × 60 mm | | | |
| 5 separating cuts | | | | |
| | Carabogran ® 0.4 to 1 mm | | | |
| | Untreated | 0.5% $Al_2O_3$ | 0.5% $TiO_2$ | 0.5% $SiO_2$ |
| Breaking speed (m/s) | 163.9 | 164.9 | 163.9 | 165 |
| Wheel density (g/cm³) | 2.04 | 2.02 | 2.04 | 2.02 |
| Diameter reduction (mm) | 10 | 8.3 | 8.3 | 8.3 |
| Relative performance factor | 100% | 117% | 117% | 117% |

EXAMPLE 4

Comparative Example

A production charge of silicon carbide (Carbogran ® F 24, LONZA-Werke GmbH, Waldshut) was divided into halves. One half was provided with a ceramically bonded coating according to the prior art.

Formula 150 kg of silicon carbide F 24
900 cm³ of sodium silicate (type 37/40 van Baerle & Co., $d^{20}$=1.35 g/cm³)
1000 cm³ of water
1600 g of iron oxide (Bayferrox ® 180, Bayer AG.)
800 g of glaze frit (type A8962p, Reimbold & Strick)

The glaze frit was worked into a homogeneous suspension with water and sodium silicate. The abrasive grain was wetted with it in a tumbler mixer, iron oxide was added in four portions and the entire mixture was homogenized in the mixer for about 10 to 15 minutes. The coating of iron oxide and binder thusly applied was sintered in a rotary tubular oven at 740° C. and an average retention time of 10 to 15 minutes. The wheel production and the wheel tests took place similarly to Example 1.

The results are shown in Table 4 (average values).

TABLE 4

| Wheel dimensions: | 230 × 2.5 × 22 mm | |
|---|---|---|
| Concrete bars: | 80 × 60 mm | |
| 5 separating cuts | | |
| | Carbogran ® F 24 | |
| | Ceramically Coated | Untreated |
| Wheel density (g/cm³) | 2.04 | 2.02 |
| Explosion speed (m/s) | 166.2 | 164.4 |
| Diameter reduction (mm) | 12 | 14 |
| | 13 | 17 |
| | 12 | 14 |
| Average reduction (mm) | 12.3 | 15.0 |
| Relative performance factor | 118% | 100% |

What is claimed is:

1. Abrasive grain comprising at least one silicon carbide particle and a binder-free unmelted coating of 0.01 to 5 percent, relative to the weight of the abrasive grain, of highly dispersed hydrophilic metal oxide particles having a particle size of primary particles of about 1–500 nm in the $d_{50}$ value and a specific surface of 5–500 m²/g according to BET from the group of silicon dioxide, aluminum oxide, titanium dioxide and mixtures thereof, on the at least one silicon carbide particle.

2. The abrasive grain according to claim 1 wherein the hydrophilic metal oxide is aluminum oxide.

3. The abrasive grain according to claim 1 wherein the hydrophilic metal oxide is a mixture of at least two of silicon dioxide, aluminum oxide and titanium dioxide.

4. The abrasive grain according to claim 1 wherein the highly dispersed hydrophilic metal oxide is applied in an amount of 0.1 to 1.0 percent, relative to the weight of the abrasive grain.

5. The abrasive grain according to claim 4 wherein the highly dispersed hydrophilic metal oxide has a particle size of primary particles of 1 to 500 nm in the $d_{50}$ value and a specific surface to 50 to 500 $m^2/g$ according to BET.

6. The abrasive grain according to claim 4 wherein the highly dispersed hydrophilic metal oxide has a particle size of primary particles of 1 to 50 nm in the $d_{50}$ value and a specific surface to 50 to 400 $m^2/g$ according to BET.

7. The abrasive grain according to claim 1 wherein the highly dispersed hydrophilic metal oxide has a particle size of primary particles of 5 to 50 nm in the $d_{50}$ value and a specific surface of 50 to 400 $m^2/g$ according to BET.

8. Process for the production of the abrasive grain according to claim 1 wherein the silicon carbide particles are coated by mixing in the dry condition with the highly dispersed hydrophilic metal oxide particles.

9. The process as claimed in claim 8 wherein the mixing is done in a tumbling mixer.

10. Process for the production of the abrasive grain according to claim 1 wherein the silicon carbide particles are coated by mixing with a suspension of the highly dispersed hydrophilic metal oxide in a vaporizable liquid and then drying the coated silicon carbide particles.

11. The process as claimed in claim 10 wherein the vaporizable liquid is a vaporizable polar liquid or a vaporizable nonpolar liquid.

12. The process as claimed in claim 10 wherein the vaporizable liquid is water.

13. A resin-bonded or ceramic-bonded abrasive wheel containing the abrasive grain of claim 1.

14. The abrasive wheel of claim 13 which also contains diamond abrasive grain, cubic boron nitride abrasive grain, or both.

15. The abrasive wheel of claim 13 wherein the abrasive wheel is a resin-bonded abrasive wheel.

16. The abrasive wheel of claim 13 wherein the abrasive wheel is a ceramic-bonded abrasive wheel.

* * * * *